United States Patent [19]

Fischer

[11] 4,038,613
[45] July 26, 1977

[54] TEMPERATURE RESPONSIVE DEVICES

[76] Inventor: Karl Fischer, Am Gaensberg, 7519 Oberderdingen, Germany

[21] Appl. No.: 560,926

[22] Filed: Mar. 21, 1975

[30] Foreign Application Priority Data
Mar. 27, 1974 Germany .............................. 2414812

[51] Int. Cl.² ...................... H01H 37/34; H01H 37/40
[52] U.S. Cl. ...................................... 337/321; 337/320
[58] Field of Search ............... 337/114, 117, 119, 320, 337/321; 200/83 B, 83 Y; 73/368.7; 62/2, 5, 7, 8; 342/227; 236/9, 21, 32, 42, 99 G, 99 H

[56] References Cited

U.S. PATENT DOCUMENTS

| 1,661,346 | 3/1928 | Sawyer | 337/320 X |
| 2,187,258 | 1/1940 | Wood | 337/320 X |
| 2,607,228 | 8/1952 | Coxon | 73/408 |
| 2,698,633 | 1/1955 | Harland | 73/386 |
| 2,717,291 | 9/1955 | Fry | 337/320 X |
| 3,121,151 | 2/1964 | Mitick | 337/320 X |
| 3,809,835 | 5/1974 | Watt | 337/320 X |

FOREIGN PATENT DOCUMENTS

| 1,964,723 | 7/1971 | Germany |
| 2,149,594 | 4/1973 | Germany |
| 2,112,976 | 10/1971 | Germany |
| 1,988,394 | 6/1968 | Germany |
| 481,416 | 8/1929 | Germany |

Primary Examiner—Harold Broome
Attorney, Agent, or Firm—Brumbaugh, Graves, Donohue & Raymond

[57] ABSTRACT

An expansible box or bellows or diaphram box comprises two corrugated metal sheets secured together in a sealed manner about their rims. The box is arranged between a transmission lever and an adjusting member. A connection piece has a flange portion which lies against the inside of one metal sheet and a tubular portion which passes through an opening in the metal sheet and through an opening in the transmission lever. The connection piece thereby serves to locate the expansible box on the transmission lever. A capillary tube is soldered inside the tubular portion and leads to a temperature sensor. The transmission lever acts on a snap switch.

25 Claims, 8 Drawing Figures

TEMPERATURE RESPONSIVE DEVICES

The invention relates to a temperature-responsive device having an expansible box or bellows which is filled with an expansible fluid and which is connected to a temperature sensor by way of a capillary tube.

Conventional expansible boxes of this type comprise two sheet metal members which are interconnected in a sealed manner. A connection piece is mounted thereon and is in the form of a solid nipple into which are bored connection passages for the capillary tube and into which the capillary tube is soldered laterally. The manufacturing costs of this connection piece are very high.

A feature of the invention is to provide a temperature-responsive device in which the capillary tube can be connected in a particularly simple manner and with low expenditure and in which centering and mounting of the expansible box can be effected in a satisfactory manner, so that a particularly simple and operationally reliable temperature regulator can also be provided.

In accordance with the invention, a temperature-responsive device comprises an expansible box which is for containing an expansible fluid and which comprises two sheet metal members which are interconnected in a sealed manner, a tubular connection piece which is inserted into an opening in one of the sheet metal members in the central region of the expansible box and which has an inner flange disposed at the inside of said expansible box and a tubular portion which extends outwardly through said opening, and a capillary tube which is inserted into the passage in said tubular portion for connecting the expansible box to a temperature sensor.

The expansible box in accordance with the invention renders it possible to manufacture a particularly simple temperature-responsive device in which a transmission lever acts upon a snap switch which is arranged transversely thereto. A simple snap switch is adequate for a simple temperature regulator, although, alternatively, a snap switch may be used which has two sets of contacts which switch at different temperatures. Such snap switches usually have two actuating springs which are located adjacent to one another, although other types of snap switches may be used in which the two sets of contacts are arranged at the opposite ends of a single snap spring.

The invention is further described, by way of example, with reference to the accompanying drawings, in which.

Figure 6A:
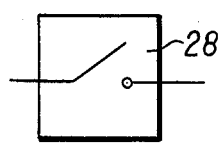
Figure 6B:
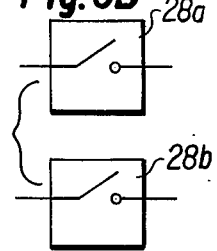
Figure 6C:
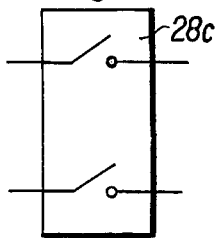

FIGS. 6A, 6B and 6C schematically illustrate different embodiments of the snap switches in a temperature regulator in accordance with the invention.

Figure 1:
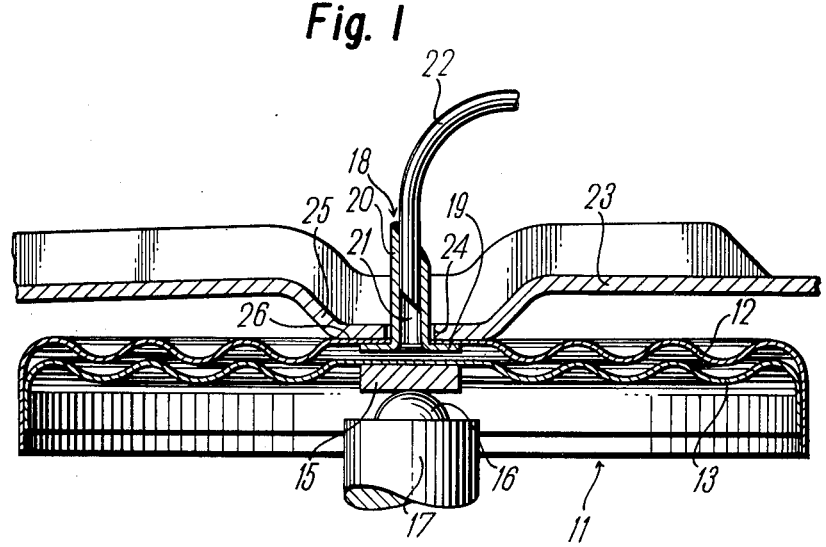
FIG. 1 is a section through an expansible box in accordance with the invention.

Referring to FIG. 1, an expansible box 11 comprises two dished sheet metal members 12, 13 having corrugated bottoms. The sheet metal member 13 is inserted into the sheet metal member 12 which is provided with the fluid connection and the two sheet metal members are soldered to one another at their edges in a sealed manner. The central region of each sheet metal member is planar and is raised in the direction of the fluid connection. A thrust pad 15 in the form of a planar disc is welded to the outside of this central region of the sheet metal member 13. The thrust pad co-operates with a ball 16 which is pressed into one end of an adjusting spindle 17.

The sheet metal member 12 has, in the region of its planar central zone, an opening through which a connection piece 18 is inserted before the two sheet metal members are fitted together. The connection piece is substantially in the form of a hollow rivet and, like the other parts of the expansible box, is made from stainless steel. The connection piece can be in the form of a tube which is beaded-over at one end to form a flange 19 which is mounted on the inside of the sheet metal member 12 by means of a contact weld. This weld is a sealed weld, like the circumferential weld of the expansible box.

The tubular portion 20 of the connection piece 18 is contiguous to the flange 19 and extends out of the expansible box. A passage 21 in the tubular portion 20 extends towards the interior of the expansible box 11 and receives a capillary tube 22 which is soldered therein. The capillary tube then leads, in a conventional manner, to a temperature sensor which is subjected to the temperature to be monitored. The end of the tubular portion 20 is cut obliquely. The tubular portion 20 is substantially thicker than the capillary tube whose external diameter must also fit into the opening in the tubular portion 20. Thus, the tubular portion 20 is suitable for guiding the entire diaphram box 11, since it does not tend to buckle and, owing to the flange 19, there is no risk that it will be torn out of the thin sheet metal of the expansible box or will bend therein. Nevertheless, it provides a satisfactory connection piece for the capillary tube.

The tubular portion 20 is passed through an opening 24 in a transmission lever 23 before the soldering operation by which the capillary tube 22 is mounted. Since the opening is a simple hole, the expansible box cannot be removed from the transmission lever after the capillary tube and the temperature sensor have been mounted. The transmission lever has a kink 25 in the region of the opening 24, so that the transmission lever abuts against the planar surface 26 of the sheet metal member 12 only in the region of the connection piece.

Figure 2:
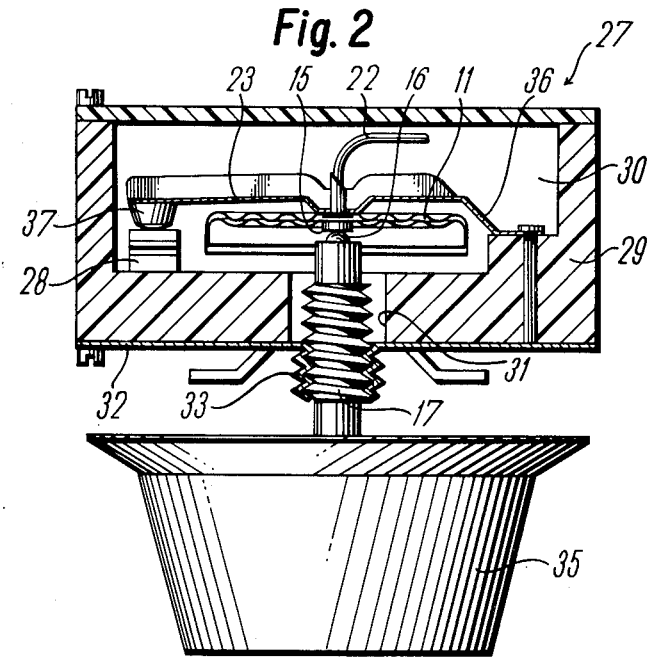
FIG. 2 is a sectional illustration of a temperature-sensitive device having an expansible box as illustrated in FIG. 1.

An expansible box of the type illustrated in FIG. 1 is fitted into the temperature-responsive device illustrated in FIG. 2. The temperature-responsive device 27 is a temperature regulator having a snap switch 28 provided with two sets of contacts which switch at different temperatures. Thus, for example, the temperature of an electric hot plate having two heating resistors, can be satisfactorily regulated by adjusting the two sets of contacts with a certain temperature differential, so that, upon approaching the set temperature, one of the heating resistors in first switched off and precision regulation of the temperature is then effected by means of the second heating resistor. Such regulators are designated "two-circuit regulators."

A regulator of this type can be constructed in a particularly simple manner using the expansible box in accordance with the invention. The regulator has an insulating housing 29 which is provided with an inner recess 30 and an opening 31 leading to the operating side where a cover plate 32 is mounted. A screw-thread 33 is formed in a drawn-out socket in the centre of the cover plate.

This screw-thread acts as a nut for the adjusting spindle 17 which is provided with an external screw-thread. An adjusting knob 35 is mounted on the adjusting spindle 17 so as to be non-rotatable relative thereto.

As is shown in FIG. 1, the thrust pad 15 of the diaphram box abuts against the ball 16 at the end of the adjusting spindle 17. One end of the transmission lever 23 has a resilient portion 36 which is mounted on the housing 29. The transmission lever thus exerts a contact pressure upon the connection side of the expansible box 11 which abuts against the ball 16 by way of the thrust pad 15.

To ensure that only the portion 36 acts as a leaf spring, and not the entire transmission lever, the transmission lever is stiffened by bending its edges particularly in the region where it acts to transmit movement. The end of the transmission lever 23, remote from the end at which it is mounted, is provided with thrust studs 37a and 37b which presses against the pressure points of the snap switches 28a and 28b, respectively (not further illustrated). In the alternative, the thrust studs 37a and 37b may be replaced by a single insulating member which is broad enough to extend over both snap switches 28a and 28b. As mentioned above in connection with FIG. 2 the two snap switches can also be replaced by a single snap switch having two sets of contacts which switch at different temperatures.

It will be seen that the diaphram box 11 is thus guided in the simplest manner despite its required movability, and its adjusting movements are transmitted directly and positively to the snap switch. The illustrated embodiment is intended for purposes in which two pole switching-off of the regulator is not essential upon the switching-off of the device. If this should be desired, a simple modification of the insulating housing renders it possible to include in the regulator an isolating switch of this type having two contact paths, this being effected by providing the adjusting spindle with a square section portion, or a portion of similar construction, on which is mounted a disc having actuating cams which actuate the two contact springs of a two pole on-off switch accommodated in the insulating housing.

Figure 3:
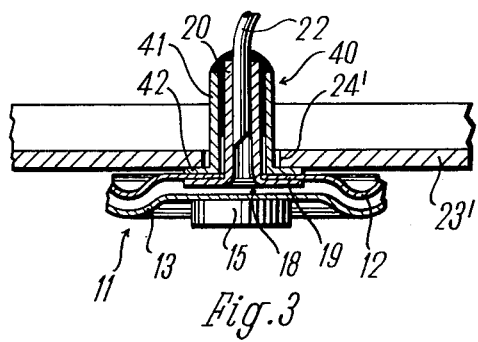
FIG. 3 shows a detail of a connection to the expansible box, according to a modification of the invention.

The expansible box illustrated in FIG. 3 is identical to that shown in FIG. 1. The same parts are provided with the same reference numerals. In FIG. 3, however, the transmission lever 23' is not provided with the kink 25 although, as in FIG. 1, it is reinforced by a bent-up portion or raised portion in its edge region. A guide member 40 is received in the opening 24' of the transmission lever 23' and, like the connection piece 18, has a tubular portion 41 which extends upwardly through the opening, and a flange 42 which is rigidly connected to the underside of the transmission lever 23' by means of a contact weld. The guide member is also in the form of a hollow rivet made from sheet metal. The internal diameter of the tubular portion 41 is larger than the external diameter of the tubular portion 20 of the connection piece 18, so that the tubular member 20 can be inserted into the tubular member 41.

The expansible box 11 is mounted by inserting the tubular portion 20 of the connection piece 18 through the opening of the guide member 40 after the connection piece 18 has been sealingly welded into the expansible box by means of contact welding, the guide member 40 having previously been welded to the underside of the transmission lever 23' by contact welding. The capillary tube is then introduced into the central opening in the tubular portion 20, and the capillary tube, the connection piece 18 and the guide member 40 are soldered to one another in a common soldering operation. For this purpose, the lengths of the connection piece 18 and the guide member 40 are dimensioned such that they terminate at approximately the same height, so that this soldering operation can be effected in a simple manner. This soldering operation, like the contact welds between the flange 42 and the transmission lever 23 and between the flange 19 and the sheet metal member 12 can be effected in a particularly simple manner, since the respective masses to be welded or soldered to one another are of approximately equal size and the ratios of thermal conductance transversely away from the respective soldering zones, are also of approximately the same order of magnitude. This is a substantial advantage compared with other capillary tube fastenings in which the capillary tube on the one hand and, on the other hand, a sheet metal member of the expansible box had to be welded or soldered to a nipple which had an effective mass (heat-absorbtive capacity) which was greater by several powers of ten than that of the capillary tube and the expansible box.

Thus, the expansible box is reliably centered and fixed on the transmission lever 23, so that the transmission lever and the expansible box form an ideal element for fitting into a switch or regulator. The connection between the connection piece and the guide piece, i.e. the transmission lever, is very advantageous although, if desired, the connection piece could be seated slidingly in the guide piece and only centered therein.

Figure 4:
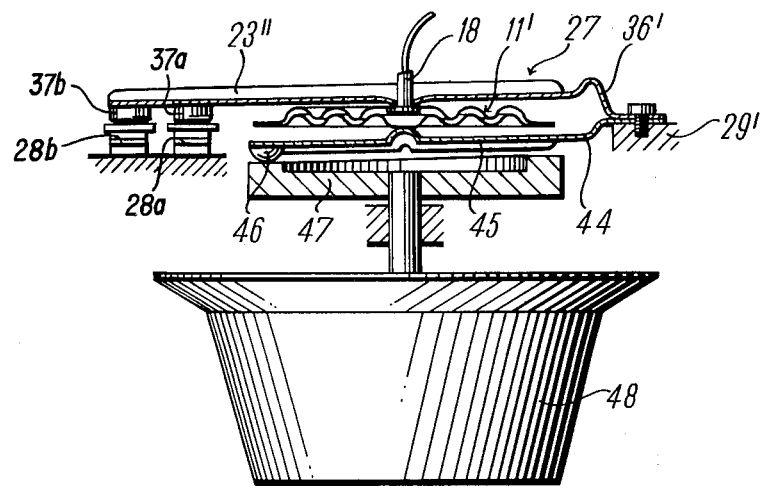
FIG. 4 shows a temperature regulator having a fluid expansion system.

FIG. 4 shows a temperature regulator 27 in which an expansible box 11' is used which is of particularly flat construction. The body of the expansible box comprises two non-dished corrugated sheet metal members which are welded flatly to one another at their edges, so that the downwardly directed edge, with which the expansible box shown in FIG. 1 is provided, is omitted. The previously described connection piece 18 is used, but the thrust pad 15 is replaced by a raised portion of the lower sheet metal member.

The connection piece 18 is guided in a transmission lever 23'' which is stiffened by bending up its edge in the region in which it overlaps the expansible box 11'. The free end of the transmission lever presses, by way of a thrust stud 37, against a snap switch 28 which is disposed transversely of the longitudinal direction of the transmission lever. Like the snap switch shown in FIG. 2, the snap switch 28 can be a snap switch having one or two sets of contacts or, alternatively, two snap switches could be located parallel to one another to be actuated by the same thrust member.

The end of the transmission lever remote from its free end has a resilient portion 36' which is riveted to a resilient portion 44 of a counter-pressure lever 45 and, together with the latter, is secured to the housing 29'. With the exception of its resilient portion 44 located at one end, the counter-pressure lever is stiffened and its free end carries a follower 46 which co-operates with a cam surface on a face cam plate 47. The cam plate lies centrally below the expansible box 11'. It is journalled in the housing and its spindle carries an adjusting knob 48 by means of which the cam plate can be rotated.

The centre of the counter-pressure lever 45 has a raised portion which abuts against the central portion of the diaphram. By virtue of the construction of their resilient portions 36 and 44, the transmission lever 23" and the counterpressure lever 45 are passed towards one another such that they hold the expansible or diaphram box 11' under a certain contact pressure.

It will be seen that the arrangement of the expansible box 11' between the transmission lever 23 and the counter-pressure lever 45 provides a particularly practical expansion system which can be readily fitted as a unit into a switch without a separate centering operation, or the like, for the expansible box. It is not essential to arrange the cam follower 46 and the thrust stud 37 at the illustrated locations, and the transmission ratio between the cam surface, the expansible box and the snap switch can be varied within very wide limits by approximately varying the positions of the elements 46 and 37. It is also possible to arrange the thrust stud 37 on, for example, the top of the transmission lever 23". The snap switch would then be located thereabove. Of course, the arrangement which is illustrated and described provides a possibility of constructing a particularly small and simple regulator which is illustrated in FIG. 4.

Figure 5:
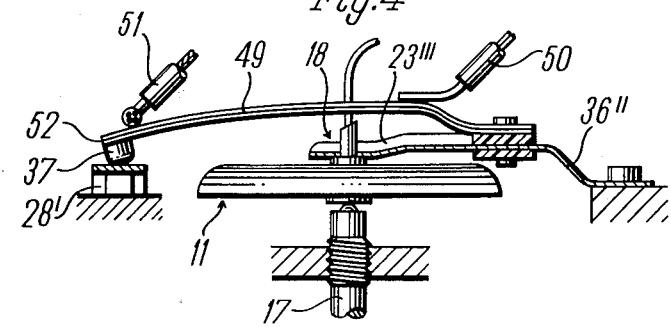
FIG. 5 shows a temperature regulator having the expansible box illustrated in FIG. 3.

While FIGS. 2 and 4 show temperature regulators which operate in the manner of the described two-circuit regulators, or which are only effective as simple adjustable temperature limiters, FIG. 5 shows a temperature regulator which operates in a regular intermittent or quantizing manner, i.e. the current to the hot plate is switched on and off to regulate the average power consumed. Of course, this is also possible with the regulators illustrated in FIGS. 2 and 4 if the expansible boxes 10 and 11' respectively are themselves provided with a heater which is rendered operative in dependence upon the switching-on of the snap switch 28.

The expansible box 11 shown in FIG. 5 is constructed in the same manner as in FIG. 3 and is also secured to a transmission lever 23''' in the same manner. The transmission lever 23''' extends only as far as the central region of the expansible box. A bimetal strip 49 is riveted at the location where the resilient portion 36" of the transmission lever merges into the stiffened region. The bimetal strip 49 is fed with current by way of terminals 50, 51 and, when it is heated, its free end 52 bends upwardly. A thrust stud 37' is mounted on the free end 52 and acts upon a snap switch 28' which is a snap switch having only one contact.

The temperature regulator is actuated by way of an adjusting spindle 17 in the form of a screw-threaded spindle. The temperature regulator operates as a pure on-off type temperature regulator by virtue of the fact that the average temperature level is set by the particular expansion of the expansible box which is dependent upon the temperature, while the bimetal strip undertakes the on-off switching. It is always heated when the snap switch is "on" and cools when the electrical appliance has also been switched off by means of the snap switch 28'. As a result of the downward movement of the bimetal strip upon cooling, the bimetal strip tends to switch the switch 28' on again after a period of time and thus ensures that the average power is fed to the electrical appliance in conformity with the temperature set by the adjusting spindle 17.

It is also possible to heat the bimetal strip indirectly, for example by means of a heating coil mounted on or in the vicinity of the bimetal strip, and/or to locate its heating arrangement in a parallel circuit. It may also be possible to omit the terminal 51 and to feed power to the snap switch by way of the bimetal strip, An electrical insulation is located between the bimetal strip 49 and the transmission lever 23'''. Thus, a simple quantizing temperature regulator of extremely small construction is provided.

FIGS. 6A, 6B and 6C each show an alternative embodiment of the snap switch or switches utilized with the temperature regulator in accordance with the invention. FIG. 6A shows a conventional snap switch 28 having a single contact. FIG. 6B shows two single contact snap switches 28a and 28b as are provided in the temperature regulator shown in FIG. 4. And FIG. 6C shows a single snap switch 28c provided with two sets of contacts which switch at different temperatures. As mentioned above, any one of the embodiments of FIG. 6A, 6B and 6C may be used in the temperature regulator in accordance with the invention.

It will be understood that the present invention is susceptible to various modifications, changes, and adaptations which fall within its spirit and scope, Accordingly, it is intended that the present invention be limited only by the following claims and their equivalents.

I claim:

1. A temperature-responsive device comprising an expansible box comprising two sheet metal members which are interconnected in a sealed manner; a temperature sensor; a capillary tube connected to the latter; means connecting said capillary tube to said expansible box; an expansible fluid filling said temperature sensor, said capillary tube and said box; a movable transmission lever which is rigidly connected with said expansible box at the side of one of said sheet metal members, said lever having an opening through which said capillary tube passes;

said one sheet metal member having a central region with an opening therein and said connecting means comprising a connection piece secured to said one sheet metal member and having an inner flange which is located inside said expansible box and a tubular portion which extends outwardly through said opening, said capillary tube being inserted into said tubular portion.

2. A device according to claim 1, in which said connection piece comprises a hollow rivet.

3. A device according to claim 1 comprising a contact weld securing said connection piece to said one sheet metal member.

4. A device according to claim 1 in which thrust pad means is mounted on the outside of the other of said sheet metal members, oppositely to said connection piece.

5. A device according to claim 1 in which said tubular portion of said connection piece extends through said opening in said movable transmission lever.

6. A device according to claim 5 in which said transmission lever applies an initial bias force to said expansible box.

7. A device according to claim 1 in which said transmission lever is in the form of a leaf spring which is provided over a portion of its length with stiffening means.

8. A device according to claim 1 further comprising a counter-pressure lever, said expansible box being fixed between said transmission lever and said counter-pressure lever, said counter-pressure lever acting on said other sheet metal member of said expansible box.

9. A device according to claim 8 in which said levers have self-resilience by which they are urged in directions towards one another.

10. A device according to claim 8 further comprising adjusting means acting upon one of said levers and snap switch means upon which the other of said levers acts.

11. A device according to claim 1 further comprising snap switch means upon which said transmission lever acts and a screwed adjusting spindle which co-operates with the expansible box at the side of the other of said sheet metal members.

12. A device according to claim 1 further comprising snap switch means upon which said transmission lever acts, and face cam means which co-operates with said expansible box at the side of the other of said sheet metal members.

13. A device according to claim 1 in which said transmission lever lies closely adjacent said expansible box and further comprising snap switch means disposed to be actuated by said transmission lever and arranged with its longitudinal dimension transverse to said transmission lever.

14. A temperature-responsive device comprising an expansible box comprising two sheet metal members which are interconnected in a sealed manner; a temperature sensor; a capillary tube connected to the latter; means connecting said capillary tube to said expansible box; an expansible fluid filling said temperature sensor, said capillary tube and said box; a movable transmission lever which co-operates with said expansible box at the side of one of said sheet metal members, said lever having an opening through which said capillary tube passes; and a guide member which is rigidly mounted on the transmission lever, said guide member having a tubular portion in which said tubular portion of said connection piece is received;

said one sheet metal member having a central region with an opening therein and said connecting means comprising a connection piece secured to said one sheet metal member and having an inner flange which is located inside said expansible box and a tubular portion which extends outwardly through said opening, said capillary tube being inserted into said tubular portion.

15. A device according to claim 14 in which said guide member has a flange which is disposed adjacent said expansible box and is secured to said transmission lever to form a support for said expansible box.

16. A device according to claim 15 comprising contact weld means securing and flange of said guide member to said transmission lever.

17. A device according to claim 15 in which said guide member comprises a hollow rivet made from sheet metal.

18. A temperature regulator for an electrical appliance comprising an expansible box having a connection piece, a temperature sensor, a capillary tube connecting said sensor to said connection piece, adjusting means which acts upon one side of said expansible box, a transmission lever which is acted upon by the other side of said expansible box and snap switch means arranged to be actuated by said transmission lever, said transmission lever extending closely across and expansible box said connection piece extending centrally into said expansible box and through an opening in said transmission lever, thus locating said expansible box on said transmission lever, said snap switch means being arranged transversely of the longitudinal extent of said transmission lever.

19. A regulator according to claim 18 in which said adjusting means comprises face cam means disposed adjacent said expansible box.

20. A temperature regulator according to claim 18 further comprising a counter-pressure lever, said expansible box being fixed between said transmission lever and said counter-pressure lever, said counter-pressure lever acting on said one side of said expansible box.

21. A device according to claim 20 in which said levers have self-resilience by which they are urged in directions towards one another.

22. A temperature regulator according to claim 18, in which said adjusting means comprises a screwed adjusting spindle.

23. A temperature-responsive device comprising an expansible box comprising two sheet metal members which are interconnected in a sealed manner; a temperature sensor; a capillary tube connected to the latter; means connecting said capillary tube to said expansible box; an expansible fluid filling said temperature sensor, said capillary tube and said box; a movable transmission lever which co-operates with said expansible box at the side of one of said sheet metal members, said lever having an opening through which said capillary tube passes and lying closely adjacent said expansible box; and snap switch means disposed to be actuated by said transmission lever and arranged transversely to said transmission lever, said snap switch means having two sets of contacts adapted to switch at different temperatures;

said one sheet metal member having a central region with an opening therein and said connecting means comprising a connection piece secured to said one sheet metal member and having an inner flange which is located inside said expansible box and a tubular portion which extends outwardly through said opening, said capillary tube being inserted into said tubular portion.

24. A temperature regulator for an electrical appliance comprising an expansible box having a connection piece; a temperature sensor; a capillary tube connecting said snesor to said connection piece; adjusting means which acts upon one side of said expansible box; a transmission lever which is acted upon by the other side of said expansible box; snap switch means arranged to be actuated by said transmission lever; and a heatable bimetal strip mounted by one end on said transmission lever, the other end of which bimetal strip acts upon said snap switch means;

said transmission lever extending closely across said expansible box, said connection piece extending centrally into said expansible box and through an opening in said transmission lever, thus locating said expansible box on said transmission lever, and said snap switch means being arranged transversely of the longitudinal extent of said transmission lever.

25. A temperature regulator according to claim 24 further comprising circuit connection means for heating said bimetal strip in dependence upon the current which is to be switched by said snap switch means and to effect the on-off switching of the current fed to the electrical appliance.

* * * * *